United States Patent [19]

Steudler, Jr.

[11] Patent Number: 4,991,621

[45] Date of Patent: Feb. 12, 1991

[54] PRESSURE REGULATOR

[75] Inventor: Frederick W. Steudler, Jr., New Providence, Pa.

[73] Assignee: Val Products, Inc., Bird-in-Hand, Pa.

[21] Appl. No.: 430,384

[22] Filed: Nov. 2, 1989

[51] Int. Cl.$^5$ .................. F16K 43/00; G05D 16/08
[52] U.S. Cl. .............................. 137/505.46; 137/614; 251/152
[58] Field of Search .................. 137/505.46, 606, 613, 137/614; 251/151, 152, 149.8, 148

[56] References Cited

U.S. PATENT DOCUMENTS

| | | | |
|---|---|---|---|
| 1,216,116 | 2/1917 | Hayward | 137/505.46 |
| 2,219,441 | 10/1940 | Carnes | 137/505.46 |
| 3,339,581 | 6/1965 | Courtot . | |
| 3,847,181 | 11/1974 | Scheiwer | 137/613 |
| 4,344,456 | 8/1982 | Hostetler | 137/505.46 |
| 4,566,489 | 1/1986 | Knapp et al. | 137/614 |
| 4,611,628 | 9/1986 | Pasternack | 137/613 X |

FOREIGN PATENT DOCUMENTS

| | | | |
|---|---|---|---|
| 241604 | 11/1910 | Fed. Rep. of Germany | 137/505.46 |
| 2911816 | 10/1980 | Fed. Rep. of Germany | 137/505.46 |
| 609942 | 8/1926 | France | 137/505.46 |
| 1259553 | 3/1961 | France | 137/505.46 |

Primary Examiner—Stephen M. Hepperle
Attorney, Agent, or Firm—Diller, Ramik & Wight

[57] ABSTRACT

A pressure regulator includes a flexible diaphragm which sets-off a liquid chamber having an inlet and an outlet for respectively introducing liquid into and discharging liquid from the liquid chamber under the control of an associated valve through an actuator operated by the movement of the diaphragm. The valve is carried by a coupling which is connected to the housing inlet which, upon the uncoupling of the coupling, allows inspection and/or repair of an associated valve seat or the actuator through the pressure regulator inlet.

The pressure regulator can be cleaned or flushed by a novel method which includes uncoupling the coupling from the liquid inlet and reversing the connection with an associated standpipe outlet and thereafter reopening the liquid inlet valve. Liquid enters the liquid chamber through the standpipe outlet and discharges the liquid chamber through the liquid outlet thereby flushing the liquid chamber in a thorough and effective manner.

11 Claims, 4 Drawing Sheets

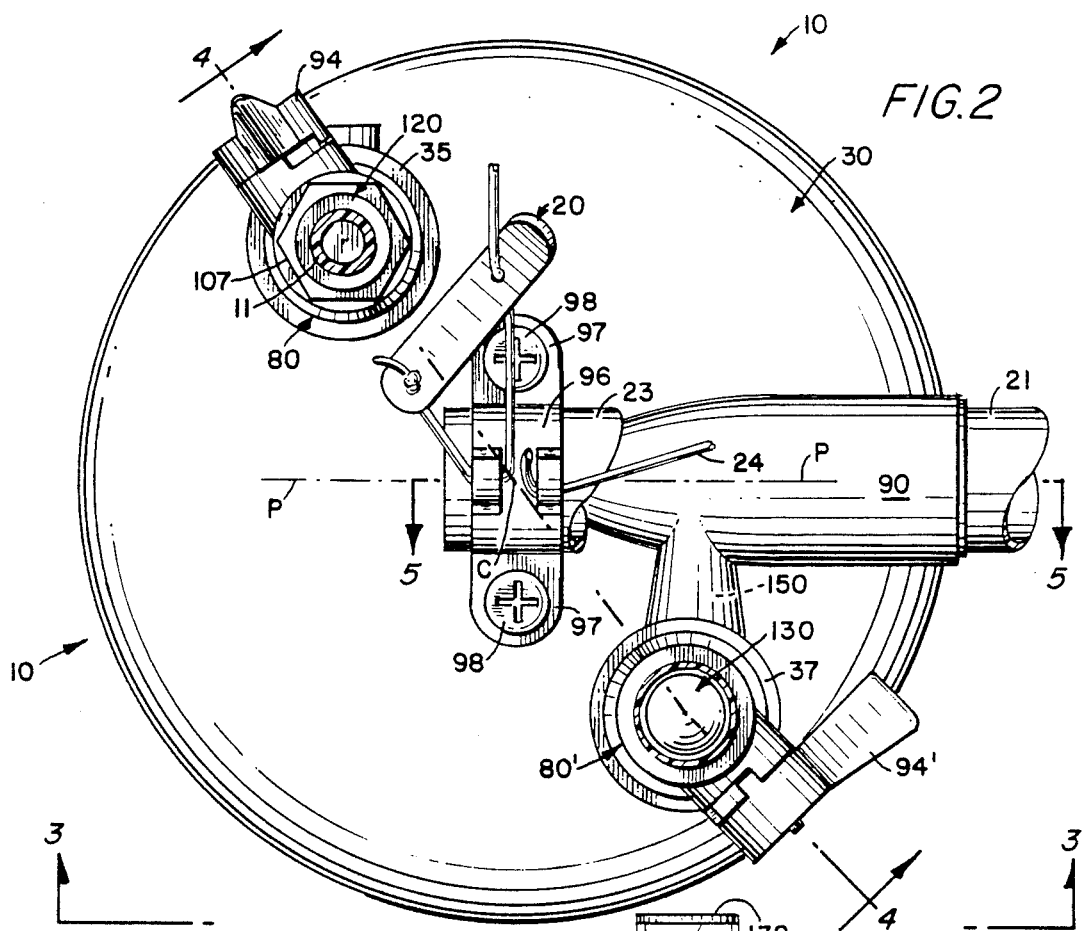
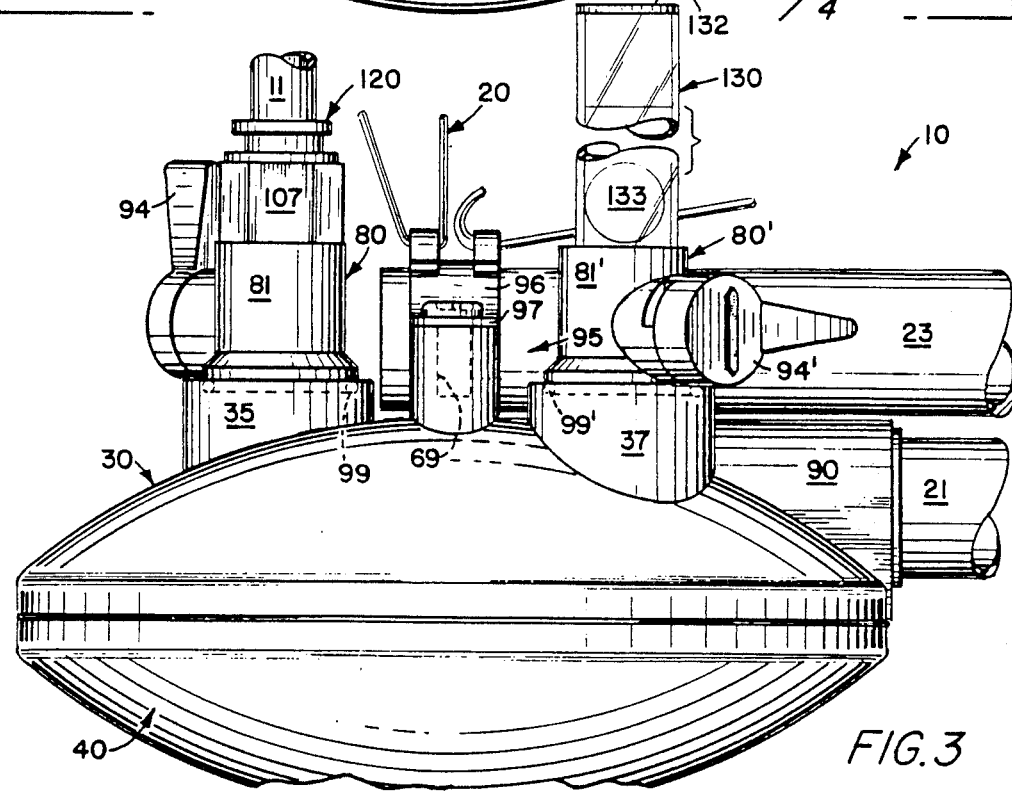

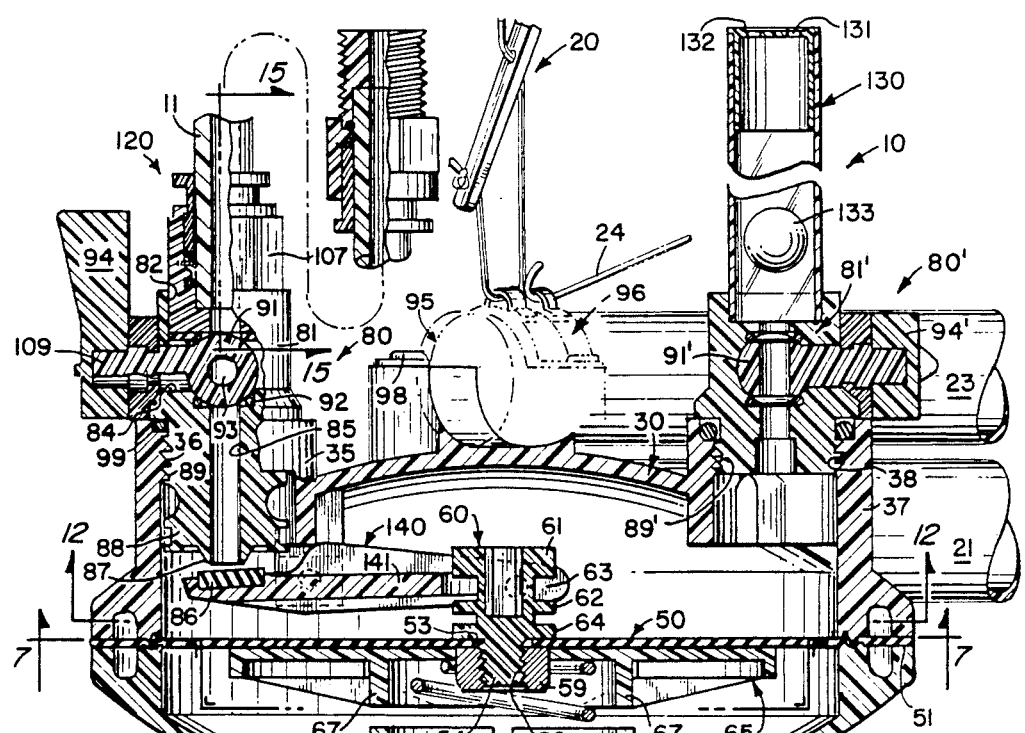
FIG.4
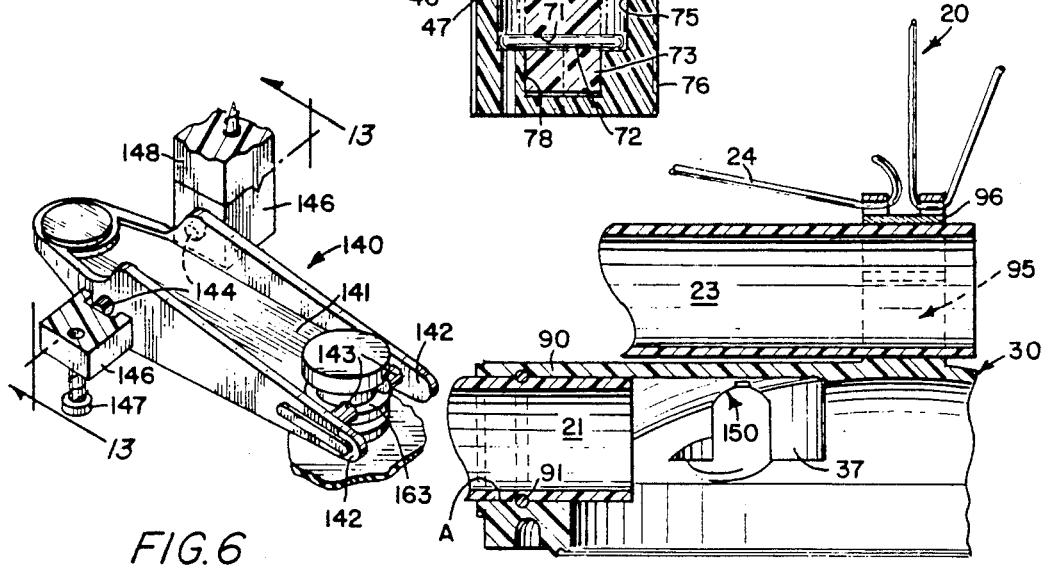
FIG.6
FIG.5

PRESSURE REGULATOR

BACKGROUND OF THE INVENTION

The invention is directed to a pressure regulator of the type disclosed in U.S. Pat. No. 3,339,581 in the name of Louis B. Courtot which granted on Sept. 5, 1967. Pressure regulators of the type disclosed in the latter-identified patent are used to maintain and regulate a low pressure at an outlet of varying rates of flow from a high pressure supply. Such pressure regulators include a valve operated by a diaphragm which is spring-loaded so as to move in response to the outlet pressure which is to be regulated. The diaphragm is then utilized to actuate a valve controlling the flow of liquid from the inlet to an outlet chamber of the pressure regulator. Pressure regulators of this type operate over a wide range of flow rates and are required to maintain a substantially constant outlet of pressure. In order to ensure the latter, the valve mechanisms thereof must permit precise throttling of the inlet flow while being of a relatively simple construction to ensure reliability and low cost.

While the latter-described pressure regulator is designed primarily for regulating the flow of gas, similar pressure-responsive flow regulators are used to regulate liquid flow, as in watering systems for poultry or animals. One such liquid flow regulator is disclosed in U.S. Pat. No. 4,344,356 in the name of Eldon Hostetler which granted on Aug. 17, 1982. Though this flow regulator affords adequate control, several disadvantages are readily apparent. One such disadvantage is the fact that in the two-part housing, the regulator must be totally disassembled to gain access to the interior and any components thereof which might be defective or inoperative, particularly the resilient valve thereof. For example, should the resilient valve or valve disc carried by the lever become worn and incapable of sealingly seating against the associated valve seat, the entire regulator must be disassembled to repair or replace the resilient valve. Obviously, there is significant downtime associated with the removal, disassembly, repair and reassembly of the entire pressure regulator, not to mention the possibility of water being accidentally discharged during the disassembly which would undesirably wet the animal excrement.

The second disadvantage of a pressure regulator of this type is the necessity of discarding the upper housing body should the valve seat become worn or corroded through use. Since the valve seat of this prior art pressure regulator is a integral part of the upper housing body, the latter must be discarded and replaced by a new upper housing body any time the valve seat becomes inoperative. Obviously replacing an entire upper housing body is a relatively expensive proposition without considering, of course, the latter noted necessity of once again totally disassembling and reassembling the entire regulator housing to replace the top housing body thereof.

Another disadvantage of the latter-noted regulator is that the inlet and outlet have axes in a common plane passing through the axis of the associated diaphragm. This arrangement prevents the regulator from being mounted in line with a stabilizer bar in parallel relationship to the axis of the liquid outlet. Accordingly, while this patented regulator can be used at the inlet end of a drinker pipe, it can not be used along the length unless undesirably offset from the stabilizer axis.

Another disadvantage of the latter-noted pressure regulator is the inability to flush the overall watering system through the regulator, or at least due so in an effective and time-efficient manner.

SUMMARY OF THE INVENTION

The novel pressure regulator of the present invention overcomes the disadvantages heretofore particularly noted in liquid-controlled pressure regulators of the type designed primarily for watering poultry and small animals, and particularly overcoming the many disadvantages of the latter-noted Hostetler patent.

For example, the pressure regulator of the present invention includes a coupling which is releasably connected to the liquid (water) inlet of the regulator housing. The coupling carries a valve seat which opposes a resilient valve carried by an actuator arm connected to an associated diaphragm of the regulator. A shut-off valve which is also carried by the releasable coupling can be closed to in-line water and the coupling removed to inspect and/or replace the resilient valve body through the housing liquid inlet. In this manner the housing need not be disassembled and water spillage and attendant damage is avoided.

The pressure regulator of the present invention also includes a novel liquid line connector defined by a connector body having a passage, an O-ring seal in the passage, and a plurality of circumferentially spaced inwardly directed ribs projecting into the passage. When the liquid line is inserted into the coupling, the O-ring seal effectively seals against an exterior surface of the line and the ribs bite into the exterior surface to prevent inadvertent/accidental withdrawal of the liquid line. However, both the O-ring seal and the circumferential ribs are rotatable relative to the coupling body which allows the coupling to be removed from the housing liquid inlet without twisting the water line during disassembly, inspection and/or repair of the valve/valve seat and subsequent reassembly of the coupling and the housing liquid inlet.

The pressure regulator of the present invention also includes an upper housing body having a liquid inlet, a liquid outlet and a standpipe outlet, and the latter components are so arranged relative to each other that a stabilizing bar can be coupled to the upper housing body with the axis thereof in parallel vertical spaced relationship to an axis of the liquid outlet and a drinker pipe connected thereto. In this fashion the upper housing body can be provided with two in line outlets and the pressure regulator can be located midlength of a drinker line. For example, a single regulator could be mounted in-line at the midpoint of a 480 foot drinker line or pipe, while offering 38 per cent more water at a given pressure than conventional regulators.

Whether the pressure regulator of the present invention is designed as a mid-house or an end regulator, the couplings associated with the water inlet and the standpipe are of the same size, each includes a shut-off valve, and the "normal" location of each can be reversed. For example, the standpipe coupling can be connected to water inlet and the water inlet coupling can be connected to the standpipe outlet. The latter is done when the shut-off valves of both, particularly the water inlet coupling, are closed. When the water inlet shut-off valve is opened, water will flow into the standpipe outlet and directly into the water outlet(s) and the watering system to flush or backflush the watering pipe or pipes connected thereto.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 2 is an enlarged cross-sectional view taken generally along line 2—2 of FIG. 1, and illustrates the angular relationship between the water inlet, standpipe outlet and water outlet and the parallel relationship of the axes of a drinker pipe, water outlet and stabilizer bar.

FIG. 3 is a fragmentary side elevational view taken generally along line 3—3 of FIG. 2, and illustrates a pair of couplers for securing the water inlet pipe and the standpipe to the upper housing body and a shut-off valve carried by each coupling.

FIG. 4 is a cross-sectional view taken generally along line 4—4 of FIG. 2, and illustrates details of the pressure regulator including a valve carried by an actuator arm which is in turn connected to a diaphragm, a valve seat defined by a threaded coupling at the inlet of an upper housing body, and a shut-off valve of the inlet coupling.

FIG. 5 is fragmentary sectional view taken generally along line 5—5 of FIG. 2, and illustrates the overlying relationship of the stabilizer bar to the water outlet and the drinker pipe coupled thereto.

FIG. 6 is a fragmentary perspective view of an actuator or lever arm, and illustrates the valve body carried thereby and the manner in which lever arm is pivoted to the housing and connected to the diaphragm.

FIG. 1, is a reduced sectional view taken generally along line 7—7 of FIG. 4, and illustrates details of the diaphragm and its connection to the housing bodies.

DESCRIPTION OF THE PREFERRED EMBODIMENTS

Figure 1:
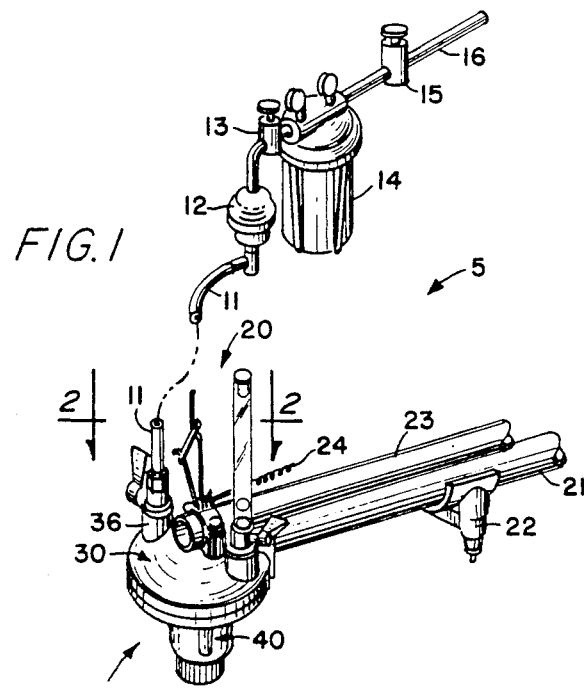
FIG. 1 is a fragmentary perspective view of a novel pressure regulator of the present invention, and illustrates an end regulator assembly in which a water inlet and a standpipe are connected to an upper housing body of the regulator and a water outlet and a stabilizing bar are in generally parallel relationship to each other.
Figure 8:
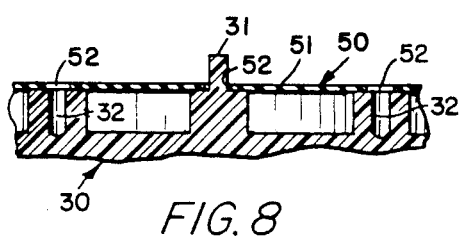
FIG. 8 is an enlarged sectional view taken generally along line 8—8 of FIG. 7, and illustrates one of several projections for locating a diaphragm relative to the upper housing body.
Figure 7:
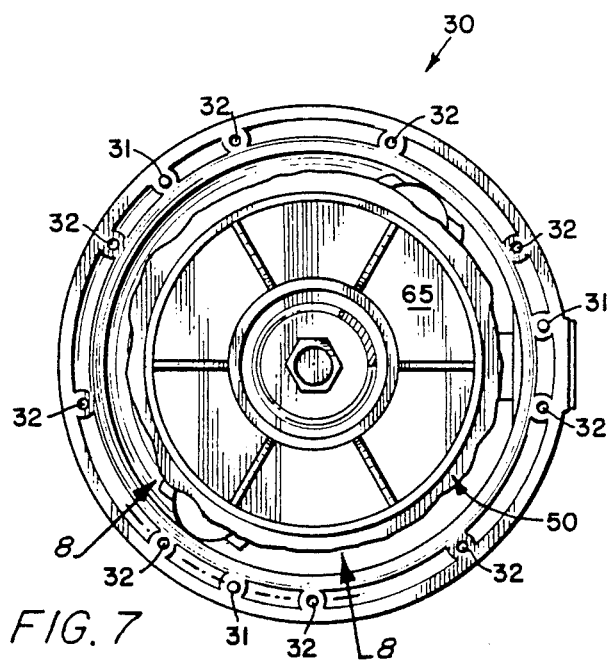
FIG. 7, which appears on the drawing illustrating
Figure 9:
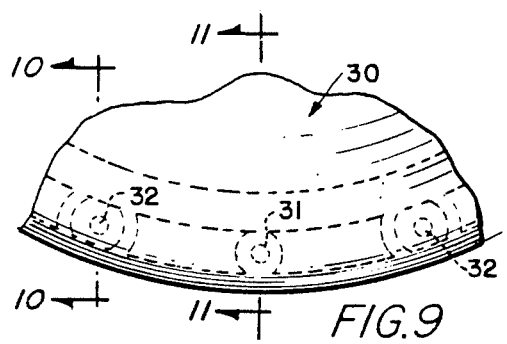
FIG. 9 is a fragmentary top plan view of an edge of the upper pressure regulator housing, and illustrates the location of the projection of FIG. 8 between a pair of bores which receive screws for assembling upper and lower regulator bodies to each other.
Figure 10:
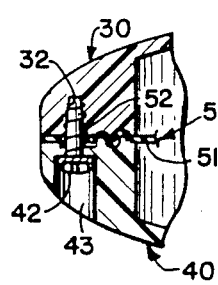
FIG. 10 is an enlarged fragmentary sectional view taken generally along line 10—10 of FIG. 9, and illustrates a screw threaded in one of the bores of FIG. 9 retaining the regulator bodies assembled with a periphery of a diaphragm sandwiched therebetween.

An end regulator assembly is illustrated in FIG. 1 of the drawings and is generally designated by the reference numeral 5. The end regulator assembly 5 includes a pressure regulator 10 which is connected to a liquid (water) inlet pipe, line or tube 11 which is in turn in successive fluid communication with a water meter 12, a shut off/control valve 13, a water filter assembly 14, another shut-off/control valve 15 and a conventional water main or pipe which supplies water to the end regulator assembly and specifically the pressure regulator 10 thereof at "line" or "main" pressure. The end regulator assembly 5 is part of an overall watering system which is disclosed in U.S. Pat. Nos. 4,669,422 and 4,724,797 granted on June 2, 1987 and Feb. 16, 1988, respectively. The overall watering system also includes a suspension system 20, a water or drinker pipe 21 carrying a plurality of nipple drinkers 22, a metallic stabilizer pipe 23 and an anti-roosting wire 24. Details of the drinker 22 are found in U.S. Pat. No. 4,660,509 granted on Apr. 28, 1987. The totality of the specifics of the latter-noted patents are incorporated hereat by reference. However, essentially water which is introduced by the water inlet pipe 11 into the pressure regulator 10 exits the latter and is introduced into the water pipe 21 for subsequent distribution to animals/poultry by the individual drinkers 22 thereof. The suspension system 20 is utilized to adjust the elevation of the overall watering system as the poultry/animals grow.

Figure 11:
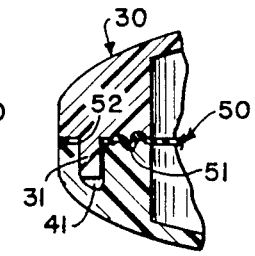
FIG. 11 is a fragmentary sectional view taken generally along line 11—11 of FIG. 9, and illustrates the manner in which the diaphragm is located by an associated projection and the latter seated in an associated bore.

The pressure regulator 10 includes a housing defined by an upper housing body 30 and a lower housing body 40 sandwiching therebetween a flexible, rubber diaphragm 50. A peripheral edge 51 of the diaphragm 50 includes a plurality of openings 52. Three groups of three openings 52 in the peripheral edge or peripheral edge portion 51 are offset 120 degrees from each other, as are three projections 31 (FIG. 11) of the housing body 30 and three blind bores 41 of the housing body 40. Each projection 31 of the upper housing body 30 passes through one of the openings 52 of the diaphragm peripheral edge portion 51 and is received in one of the associated blind bores 41 to thereby accurately locate the diaphragm peripheral edge 51 in sandwich relationship between the regulator housing bodies 30, 40. Screws 42 pass through counterbored openings 43 of the lower housing body 40, through selected ones of the openings 52 of the diaphragm 50 and are threaded into blind bores 32 of the upper housing body 30. Thus, the projections 31 and blind bores 41 accurately locate the diaphragm 50 and the bodies 30, 40 relative to each other, and screws 42 retain these components in assembled relationship.

Figure 18:
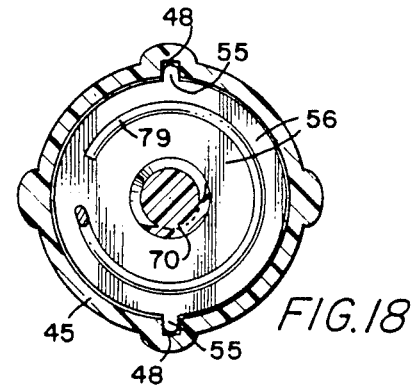
FIG. 18 is a cross-sectional view taken generally along line 18—18 of FIG. 4, and illustrates a spring for adjusting discharge pressure.

The diaphragm 50 includes a central circular opening 53 (FIG. 4) through which is inserted from the top down, as viewed in FIG. 4, a threaded end portion 54 of a one-piece mounting stud 60 having upper and lower peripheral flanges 61, 62, respectively, defining therebetween a radially outwardly opening circumferential slot 63. A third flange 64 of the stud 60 bears against an upper surface (unnumbered) of the diaphragm 50 while a separate annular disc 65 having a circular opening 66 is slipped on the threaded end portion 54 from below after which a nut 59 is secured to the threaded end portion 54. Thus, the diaphragm 50 is sandwiched between the flange 64 and the disc 65 which also includes an integral downwardly projecting sleeve 67. The sleeve 67 is in axial aligned opposition to an inner upwardly projecting sleeve 44 of the lower housing body 40 which also includes a downwardly projecting annular sleeve 45 having a radially inwardly directed flange 46 defining a circular opening 47. A pair of diametrically opposite slots 48, 48 (FIG. 18) are formed in the sleeves 44, 45, and each slot 48 ends at a blind end (unnumbered) slightly above the flange 46 (FIG. 4).

Diametrically opposite fingers 55 (FIG. 18) of a plate 56 having a centrally threaded bore 57 are slidably received in the slots 48. An externally threaded screw 70 is threaded into the centrally threaded bore 57 of the plate 56 and has a diametrically through bore 71 which receives a cross pin 72 of a length projecting beyond opposite ends of the bore 71. The bore 71 is positioned slightly above an exteriorly hexagonally configurated end portion 73 of the externally threaded screw 70. The cross pin 72 is just slightly less than the diameter of a cylindrical bore 75 of an exteriorly knurled knob or handle 76 which has a radially outwardly directed flange 77 and a hexagonal recess 78 which matches and receives the hexagonally exteriorly contoured end portion 73 of the threaded screw 70. A spring 79 is seated between the underside of the disc 65 and the plate 56. The spring 79 is provided to apply an upwardly directed force through the disc 65 against the diaphragm 50 and thus regulate the pressure afforded by the valve regulator 10, as will be more apparent hereinafter. However, as the knurled knob 76 is rotated clockwise, as viewed from below, the hexagonal recess 78 forms a drive connection with the hexagonal end portion 73 of the exteriorly threaded screw 70 to rotate the screw 70 clockwise which raises the plate 56 to thus progressively compress the sping 79 between the disc 65 and the plate 56. The greater the compression applied to the spring 79, the greater the force applied to the diaphragm 50 and vice versa. Thus, rotation of the knurled knob 76 counterclockwise, again as viewed in FIGS. 1 and 4, threads the screw counterclockwise, again as viewed from below, to draw the plate 56 downwardly to decrease the tension on the spring 79 and thus decrease the upwardly directed force upon the diaphragm 50. It should be noted that during clockwise and clounterclockwise rotation of the screw 70, the plate 56 can not rotate because of the engagement of the fingers 55 in the slots 48. Thus, rotation in either direction of the screw 70 through the manipulation of the knob 76 results in vertical upward or downward motion imparted to the plate 56. The cross pin 72 functions to limit maximum downward threading of the plate 56 upon the threaded screw 75 to assure that the latter components do not inadvertently disassemble.

The upper housing body 30 includes a generally cylindrical liquid or water inlet 35 of a relatively large internal diameter and having internal threads 36. The axis of the liquid inlet 35 is parallel to the axis of a standpipe outlet 37 having a relatively large interior bore and also having internal threads 38. The size of the bores and the threads 36, 38 of the respective liquid inlet 35 and standpipe outlet 37 are identical for a purpose to be described more fully hereinafter. A liquid or water outlet 90 has a generally horizontally disposed axis, as viewed best in FIG. 3, which is also generally normal to the axes of the liquid inlet 35 and the standpipe outlet 37. The outlet 90 carries an O-ring 91 (FIG. 5) which is in sealing contact with the end of the drinker pipe 21 housed therein (FIG. 5). The housing 30 and the pipe 21 are preferably made from plastic material which are secured to each other by appropriate adhesive A (FIG. 5).

Means 95 is an integral generally U shaped upwardly opening saddle into which is received and seats an end (unnumbered) of the stabilizer pipe 23. An inverted U shaped clip 96 overlies the stabilizer pipe 23 and screws 98 pass through flanges 97 (FIG. 2) of the clip 96 and are secured into threaded bores 69 (FIG. 3) of the saddle 95. Thus, the saddle 95 and clip 96 collectively set off a generally circular opening into which the end of the stabilizing pipe 23 is received and secured, and the axis of the opening lies in a vertical plane P (FIGS. 2 and 12) which passes through the axis of the stabilizer pipe 23, the axis of the drinker pipe 21 and the center C of both housing bodies 30, 40 which corresponds to the center of the stud 60. The plane P is offset from a vertical plane Pl which passes through the center C and the axes (unnumbered) of the liquid inlet 35 and the standpipe outlet 37 (See FIGS. 2 and 12). The significance of the planes P, P1 will be more apparent hereinafter, but suffice it to say that the position of the outlet 90 with its axis and that of the axis of the saddle or coupling means 95 along the plane P allows the stabilizing pipe 23 to be connected to the upper housing body 30 exactly along the center C thereof and in directly overlying relationship to the drinker pipe 21.

Figure 17:
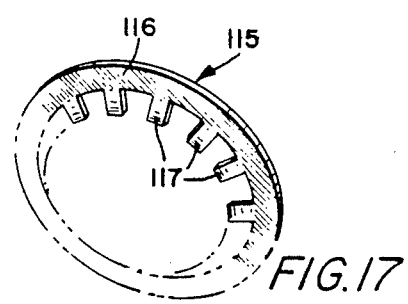
FIG. 17 is perspective view, partially in phantom outline, of a locking ring of the mechanism of FIG. 15, and illustrates a plurality of locking ribs thereof.

The water inlet pipe or tube 11 is connected to the water inlet 35 of the upper regulator housing 30 by coupler or coupling means generally designated by the reference numeral 80. The coupling means 80 includes a coupling body 81 having an upper relatively large cylindrical surface or bore 82 (FIG. 15) merging with a radial or annular face 83 which in turn merges with a radial through bore 84 which in turn merges with an axial passage or bore 85 which opens into an interior chamber C defined between the diaphragm 50 and the upper housing body 30. The passage 85 is opened and closed by a valve, valve body or valve member 86 as it seats upon or unseats from a valve seat 87 of a lower end portion 88 of the coupling body 81. Threads 89 of the coupling body 81 match the threads 36 of the water inlet 35. An O-ring seal 99 carried by the coupling body 81 seats against an annular axial face (unnumbered) of the water inlet 35. A valve 91 is seated on an O-ring 92 and has a diametric passage 93 which upon rotation of a handle 94 keyed to a stem 109 of the valve 91 will move the valve or valve body 91 into its shut-off position (FIG. 5) or its open position when the passage 93 is aligned with the passage 85. When the valve or valve body 91 is closed (FIG. 4), the coupling body 81 of the coupling means 80 can be rotated counterclockwise, as viewed from above, to remove the coupling body 81 from the water inlet 35 by unthreading the threads 36, 89 for purposes to be described more fully hereinafter. The coupling means 80 also includes rotatable connecting means or connector means 100 (FIGS. 4 and 15) for connecting the water inlet 11 to the coupling body 81, yet allowing the coupling body 81 to be rotated clockwise or counterclockwise without rotating and/or twisting the water pipe 11. The rotatable connecting means 100 includes a connector body 101 having a cylindrical bore or passage 102 and a reduced counterbore or passage 103 aligned with an opening 104 of a relatively flat washer 105 suitably carried by an end face (unnumbered) of the connector body 101. A lower exterior surface 106 of the connector body is cylindrical and is bonded by adhesive A to the cylindrical bore 82 of the coupling body 81. An upper exterior surface 107 of the connector body 101 is knurled for the receipt of a wrench or the like. An O-ring seal 110 is housed in a radially opening groove 111 of the connector body 101 and immediately above the latter is a downwardly converging frusto-conical surface 112 which immediately thereabove merges with a radially inwardly opening groove 113 in which seats means 115 (FIG. 17) for gripping an exterior surface E of the water pipe 11. The means 115 includes a brass ring 116 from which radially inwardly projects a plurality of ribs or fingers 117. The ribs or fingers 117 converge downwardly, as viewed at the left-hand side of FIG. 15, and when the water pipe 11 is pushed downward into the bore 102, the fingers 117 bite into the exterior surface E and prevent the water pipe 11 from being pulled axially upwardly and outwardly, as best illustrated by the left-hand side illustration of FIG. 15. However, the gripping means or gripping ring 115 is free to rotate in the groove 113 as is the O-ring 110 within the groove 111. Thus, when the end of the water pipe 11 is gripped by the ribs 117 and sealed by the O-ring 110, the connector body 101 can be turned or rotated without turning or rotating the water pipe 11. Obviously, rotation imparted to the connector body 110 through the hexagonal faces 107 is transferred to the coupling body 81 through the adhesive A connection therebetween to rotate the latter during threading and unthreading of the threads 36, 89. Therefore, the coupling and uncoupling of the coupling means 80 can be accomplished without in anyway rotating, turning, twisting or otherwise adversely affecting the connection between the water inlet pipe 11 and both its grip and sealed connection relative to the gripping means 115 and the O-ring seal 110.

Figure 16:
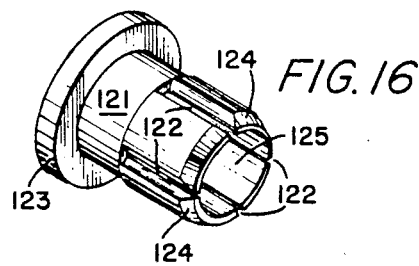
FIG. 16 is a perspective view of a sleeve of the mechanism of FIG. 15, and illustrates details thereof.

Means (FIGS. 16) generally designated by the reference numeral 120 is provided for releasing the gripping engagement between the ribs 117 and the exterior E pipe 11. The means 120 is a sleeve 121 having a plurality of axially extending slots 122 and an upper radially outwardly directed flange 123. A bottom edge 124 of the sleeve 121 is tapered. An exterior bore or passage 125 is of a size to freely receive the exterior surface E of the inlet pipe 11.

Figure 15:
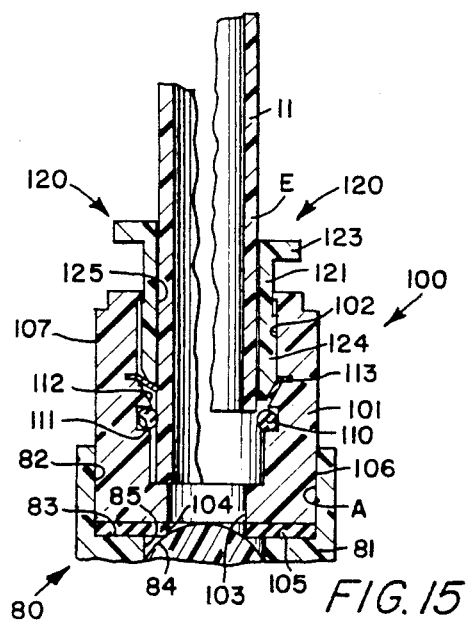
FIG. 15 is an enlarged sectional view taken generally along line 15—15 of FIG. 4, and illustrates a mechanism for releasably securing a water line to the regular inlet.

Before the inlet tube 11 is inserted into the bore 102, the sleeve 121 is inserted into the bore 102 to the position shown on the left-hand side of FIG. 15. In this position the lower edge 124 of the sleeve 121 is resting upon the downwardly converging ribs 117 of the gripping means or gripping ring 115. The end of the inlet pipe 111 is then inserted into the passage or bore 125 of the sleeve 121. The exterior E of the inlet pipe 11 is somewhat greater than the diametric distance between the terminal edges (unnumbered) of diametrically opposite ribs 117. Thus, as the inlet pipe 11 is pushed downwardly into the passage 125, the ribs 117 are deflected downwardly toward but not against the frusto-conical surface 111. Once the inlet pipe 11 is fully seated in the connector body 101, as shown at the left hand side of FIG. 15, the edges (unnumbered) of the ribs 117 are in biting gripping engagement with the exterior E of the inlet pipe 11. Any upward pull on the pipe 11 would increase this gripping action because the tendency would be to draw the ribs 117 upwardly thereby decreasing the diametrical distance between diametrically opposite edges and thus increase the gripping effect. However, by applying a downward axial force against the grip releasing means 120, the bottom edges 124 deflect the ribs 117 downwardly out of biting gripping engagement with the surface E of the inlet pipe 11, as indicated by the right-hand side of FIG. 15, thereby releasing the gripping means 115 and allowing the water inlet pipe 11 to be freely withdrawn vertically upwardly and thus removed from the overall coupling means 80.

Coupling means 80' (FIG. 4) are also provided for securing a standpipe 130 to the standpipe outlet 37. The standpipe 130 is made of transparent plastic and has several openings 131 in an upper wall 132 thereof. A ball of bouyant material 133 will rise and fall in the standpipe 130 dependent upon the level of water therein and, hence, the pressure within the chamber C. Appropriate graduations (not shown) are provided on the standpipe 130 which calibrate the vertical position of the ball 133 to the outlet pressure of the water delivered to the outlet pipe 21 and, hence, the drinkers 22 thereof. Since the coupling means 80' is identical to the coupling means 80 a further description thereof if unnecessary, although like components have been identically numbered and primed. Of particular importance is the fact that the coupling means 80' also includes valve means in the form of a shut-off valve 91' and also that the coupling body 81' includes threads 89' which match the threads 38. As will be more fully described hereinafter, the coupling means 80, 80' can also be interchanged between the positions shown in FIG. 4 such that when the valves 91, 91' are closed, the coupling body 81 can be removed from the water inlet 35 and inserted into the standpipe outlet 37 while the coupling means 80' can be removed from the standpipe outlet 37 and threaded into the water inlet 35.

The resilient valve, valve body or valve member 86 is carried by actuating means 140 in the form of a lever arm 141 (FIG. 6) having a pair of bifurcated legs 142 from each of which are directed opposing trunnions 143 housed in the slot 63 of the mounting stud 60. Oppositely directed pintles or pivot pins 144 are housed in recesses 145 of blocks 146 which are in turn connected by screws 147 to bosses 148 forming integral downward extensions of the housing 30. As is best illustrated in FIG. 4, should the lever arm 141 pivot clockwise about the trunnions or pivot pins 141, the resilient valve body 86 will seat against the valve seat 87 closing off the introduction of water from the passage 85 into the chamber C whereas opposite counter-clockwise rotation of the lever arm 141 will open fluid communication, as is illustrated in FIG. 4.

Figure 12:
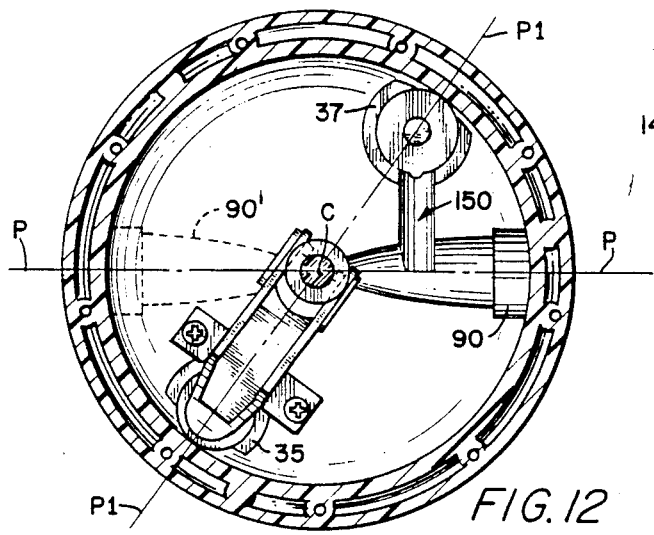
FIG. 12 is a reduced cross-sectional view taken generally along line 12—12 of FIG. 4, and illustrates a plane common to axes of the water inlet and the standpipe outlet and another plane of the water outlet offset from the first mentioned plane.
Figure 13:
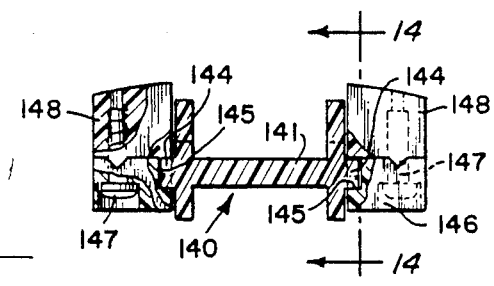
FIG. 13 is a cross-sectional view taken generally along line 13—13 of FIG. 6, and illustrates details of the mounting of the lever arm to downwardly depending bosses of the upper regulator housing.
Figure 14:
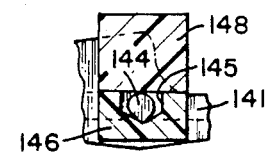
FIG. 14 is a cross-sectional view taken generally along line 14—14 of FIG. 13, and illustrates details of the pivotal mounting of the lever arm and one of the bosses.

Reference is made to FIGS. 5 and 12 and a downwardly opening recess or passage 150 formed in an interior surface (unnumbered) of the upper regulator housing 30 which places the water outlet 90 in fluid communication with the standpipe outlet 37. The recess 150 is necessary because of the offset heretofore noted between the planes, P, P1 (FIGS. 2 and 12).

DESCRIPTION OF THE OPERATION

The operation of the pressure regulator 10 will now be described, and it will be assumed that the end regulator assembly 5 (FIG. 1) has just been assembled for the first time and the valves 13, 15, 91 and 91' are closed. It is also assumed that the knurled knob or handle 76 has been rotated sufficiently to compress the spring 79 to achieve a predetermined pressure, as, for example, as low as one-quarter pound over a watering system which might include up to 480 feet of the drinker pipe 21.

The valves 13, 15, 91 and 91' are opened and water from the "main" line 16 is introduced by the water inlet pipe 16 through the now opened valve 91 and the passage 85 into the chamber C. At this point the resilient valve 86 is, of course, not seated upon the valve seat 87. Water in the chamber C is discharged through the discharge outlet 90 into the drinker pipe 21 and once filled, the water rises and enters the standpipe 130 through the opened valve 91' and the standpipe outlet 37. The pressure builds up in the pipe 21, assuming the drinkers 22 are in their automatically closed position and are not being opened by drinking poultry or animals, at which time the pressure in the chamber C increases and, thus, constantly urges the diaphragm 50 downwardly against the upwardly directed force of the spring 79. The diaphragm 50 progressively lowers and the stud 60 begins pivoting the lever arm 141 of the actuator mechanism 140 clockwise, as viewed in FIGS. 4 and 6 about the trunnions 144 thereby progressively raising the resilient valve 86 until it seats against the valve seat 87 and closes off the flow of water into the chamber C. As poultry/small animals draw water from the drinker pipe 21 through the individual drinkers 22, the pressure in the pipe 21 decreases, as does the pressure in the chamber C, and the spring 79 raises the diaphragm 50 causing the lever arm 141 to pivot counterclockwise, again as viewed in FIGS. 4 and 6, resulting in the valve 86 moving away from the valve seat 87 to again introduce water into the chamber 140. In this fashion discharge pressure is controlled in an exacting and reliable manner.

A major problem of watering systems of this type is the possibility of particles passing beyond the filter 12 or corrosion creating such particles which can accumulate between the valve seat 87 and the resilient valve 86 preventing the same from closing and forming a watertight seal. Obviously, wear of the valve body 86 will eventually prevent the formation of a watertight seal. Should it be noted that the pressure regulator 10 is not operating as desired, which is reflected by the position of the ball 133 being other than desired, a flushing of the entire system might dislodge accumulated particles, particularly in the area of the valve seat 87 and the valve 86, or anywhere else within the system. In order to flush or reverse flush the system, the valves 91, 91' are closed and the coupling means 80, 80' are removed from the respective water inlet 35 and the standpipe outlet 37. Since the valves 91, 91' are closed, water from the water line 10 and from the standpipe 130 can not leak. The standpipe 130 is then connected through its coupling means 80' to the water inlet 35 and the coupling means 80, including the water inlet pipe 11, is connected to the standpipe outlet 37. The valve 91 is then opened and full line pressure is directed through the passage 85 into the chamber C and will rapidly flow through the chamber C and the outlet 91 into the drinker pipe 21 which at its far end has a spigot valve (not shown) which is opened. Thus, the full force and high flow rate of the water discharging the passage 85 enters the chamber C and quickly scours and removes debris therefrom, including any debris upon or associated with the valve seat 87 and the valve 86. It is important to note that in these relatively exchanged positions of the standpipe 130 and the water pipe inlet 11 the discharge passage 85 is no longer restricted at the valve seat 87 because of the close proximity of the valve 86, and thus extremely high water flow rate flushes the chamber C, the components thereof, and any debris which may have accumulated therein or in the drinker pipe 21 discharging the same at the open spigot of the latter.

Once the flushing operation has been completed, the standpipe 130 and the water pipe 11 including the coupling means 80 of the latter, are returned to their "home" or operative positions shown in FIG. 4.

It is also to be particularly noted that the valve seat 87 can be inspected very rapidly, as can the valve 86, without disassembling the regulated bodies 30, 40 by simply again closing the valve 91 and unthreading the coupling means 80 from the water inlet 35. Not only can the valve seat 87 be inspected, but so too can the valve 86. The water inlet 35 has in internal diameter which is sufficiently large to permit a poultry man to inspect the valve 86, clean debris therefrom if necessary, and also to remove, flip over and reseat the valve 86 or substitute a new valve for the valve 86 should the latter be worn. This takes but mere seconds and can be done in the absence of any type of disassembly of not only the pressure regulator 10 but the overall end regulator assembly 5. Obviously, if the valve seat 87 is worn, the valve 13 must be closed, the coupling means 80 removed from the water inlet 35, and thereafter the water pipe 11 removed from the rotatable connection means 100 in the manner heretofore described relative to FIGS. 15 through 17. A new coupling means 80, including the new valve seat 87 is then reassembled to the water pipe 11 and threaded to the water inlet 35. Thus, in this fashion, the valve seat 87 can be removed, inspected and, if necessary, replaced also without disassembling the regulator bodies 30, 40.

The advantage of the disposition of the outlet 90 and the drinker pipe 21 with the axes thereof along the vertical plane P had been mentioned earlier, but it is again noted that this same plane P passes through the axis of the stabilizer pipe 23. Therefore, the weight afforded the overall system by the stabilizer pipe 23 lies along the center C of the pressure regulator 10 and, therefore, assures that the regulator 10 is suspended by the suspension means 20 with its center normal to a horizontal plane. This disposition assures accurate operation of the pressure regulator 10 which could otherwise be adversely affected if, for example, the pressure regulator 10 were cocked at an angle to the vertical such that, for example, binding might occur between the trunnions 143 and the pinions 144 of the lever arm 141 and the respective slot 63 and recesses 145.

As was also noted earlier, the pressure regulator 10 is designed as an end regulator assembly basically meaning that the regulator upper housing 30 has a single outlet 90. However, the invention is equally applicable to a mid-house or mid-line regulator assembly which would differ from that illustrated only in that a second outlet 90' (FIG. 12) would be formed in the upper housing body 30 with its axis in alignment with the axis of the outlet 90 and, of course, in the plane P. Thus, in this case the drinker pipe 21 would not only be glued by the adhesive A into the outlet 90, but an identical pipe projecting in the opposite direction (not shown) and it would be adhesively secured to the outlet 90'. As is apparent in FIG. 12, this added outlet 90' defines an angle between the plane P thereof and the plane P1 which is identical to the angle of these same planes relative to the outlet 90. Thus, the offset relationships of the outlets 90, 90' relative to the plan P1 assures the absence of interference between the outlets, the actuator means 140 and the coupling means 80, 80'. Obviously, in this same arrangement the relatively offsetting of the planes P, P1 assures that the stabilizer pipe 23 can similarly span diametrically across the top housing body 30 and in doing so the axis thereof is once again in the plane P of the drinker pipes extending in opposite direction from the outlets 90 and 90'.

Although a preferred embodiment of the invention has been specifically illustrated and described herein, it is to be understood that minor variations may be made in the apparatus without departing from the spirit and scope of the invention, as defined in the appended claims.

I claim:

1. A pressure regulator comprising a housing, a flexible diaphragm in part setting-off a liquid chamber in said housing, an inlet and an outlet for respectively introducing liquid into and discharging liquid from said liquid chamber, valve means adjacent said inlet for selectively controlling liquid flow into said liquid chamber through said inlet, actuator means operative by said diaphragm for actuating said valve means, said valve means including a valve seat and a valve, coupling means for releasably coupling a liquid line to said inlet, one of said valve seat and valve being carried by said coupling means, the other of said valve seat and valve being carried by said actuator means whereby upon the uncoupling of said releasable coupling means at least one of said one and other valve seat and valve can be removed from said inlet, and shut-off valve means carried by said coupling means for preventing liquid flow through said coupling means incident to the removal thereof from said inlet.

2. A pressure regulator comprising a housing, a flexible diaphragm in part setting-off a liquid chamber in said housing, an inlet and an outlet for respectively introducing liquid into and discharging liquid from said liquid chamber, valve means adjacent said inlet for selectively controlling liquid flow into said liquid chamber through said inlet, actuator means operative by said diaphragm for actuating said valve means, said valve means including a valve seat and a valve, coupling means for releasably coupling a liquid line to said inlet, one of said valve seat and valve being carried by said coupling means, the other of said valve seat and valve being carried by said actuator means whereby upon the uncoupling of said releasable coupling means at least one of said one and other valve seat and valve can be removed from said inlet, the other of said one and other valve seat and valve is accessible through said inlet, and shut-off valve means carried by said coupling means for preventing liquid flow through said coupling means incident to the removal thereof from said inlet.

3. The pressure regulator as defined in claim 1 including means for rotatably connecting a liquid inlet line to said coupling means, and means for rotatably connecting said releasable coupling means to said housing whereby said liquid line will not rotate upon rotation of said releasable coupling means.

4. The pressure regulator as defined in claim 1 wherein said valve is carried by said actuator means.

5. The pressure regulator as defined in claim 2 including means for rotatably connecting a liquid inlet line to said coupling means, and means for rotatably connecting said releasable coupling means to said housing whereby said liquid line will not rotate upon rotation of said releasable coupling means.

6. The pressure regulator as defined in claim 2 wherein said valve is carried by said actuator means.

7. The pressure regulator as defined in claim 1 including means for rotatably connecting a liquid inlet line to said coupling means, and means for rotatably connecting said releasably coupling means to said housing whereby said liquid line will not rotate upon rotation of said releasable coupling means.

8. The pressure regulator as defined in claim 1 including a liquid inlet tube, and means for releasably connecting said inlet tube to said coupling means upstream of said shut-off valve means.

9. The pressure regulator as defined in claim 2 including a liquid inlet tube, and means for releasably connecting said inlet tube to said coupling means upstream of said shut-off valve means.

10. The pressure regulator as defined in claim 3 wherein said liquid inlet line connecting means is upstream of said shut-off valve means.

11. The pressure regulator as defined in claim 5 wherein said liquid inlet line connecting means is upstream of said shut-off valve means.

* * * * *